(12) United States Patent
Thornton et al.

(10) Patent No.: US 8,975,197 B2
(45) Date of Patent: Mar. 10, 2015

(54) FLEXIBLE LAMINATE STRUCTURE

(71) Applicant: Stern & Stern Industries, Inc., Hornell, NY (US)

(72) Inventors: Peter B. Thornton, Bronxville, NY (US); Arthur Russell Nelson, Decatur, AL (US)

(73) Assignee: Stern & Stern Industries, Inc., Hornell, NY (US)

( * ) Notice: Subject to any disclaimer, the term of this patent is extended or adjusted under 35 U.S.C. 154(b) by 0 days.

(21) Appl. No.: 13/867,004

(22) Filed: Apr. 19, 2013

(65) Prior Publication Data

US 2013/0280531 A1 Oct. 24, 2013

Related U.S. Application Data

(60) Provisional application No. 61/635,721, filed on Apr. 19, 2012, provisional application No. 61/635,521, filed on Apr. 19, 2012.

(51) Int. Cl.

| | |
|---|---|
| *B32B 27/32* | (2006.01) |
| *B32B 5/04* | (2006.01) |
| *B32B 37/06* | (2006.01) |
| *C08L 27/18* | (2006.01) |
| *B32B 5/02* | (2006.01) |
| *B32B 5/08* | (2006.01) |
| *B32B 27/12* | (2006.01) |
| *B65G 15/32* | (2006.01) |
| *F16L 59/02* | (2006.01) |
| *F16L 11/02* | (2006.01) |

(52) U.S. Cl.
CPC . *B32B 5/04* (2013.01); *B32B 37/06* (2013.01); *C08L 27/18* (2013.01); *B32B 5/024* (2013.01); *B32B 5/026* (2013.01); *B32B 5/08* (2013.01); *B32B 27/12* (2013.01); *B32B 27/322* (2013.01); *B65G 15/32* (2013.01); *F16L 59/029* (2013.01); *F16L 11/02* (2013.01); *B32B 2262/02* (2013.01); *B32B 2433/02* (2013.01); *B32B 2597/00* (2013.01)
USPC ........... 442/289; 442/286; 442/394; 442/401; 442/414; 442/415; 403/28; 198/846; 138/137

(58) Field of Classification Search
CPC B32B 2262/00; B32B 2433/02; B32B 5/224; B32B 5/08; B32B 5/026; B32B 27/12; B32B 37/06; B32B 25/04; B32B 27/322; B65G 15/32; F16L 11/02; F16L 59/029; C08L 27/18
USPC ......... 138/118, 123, 137, 140, 141, 145, 152, 138/172; 285/223; 403/28; 198/846; 428/33, 192, 193, 194, 195.1, 196, 428/197, 200, 203, 292.1, 296.7, 297.1, 428/297.4, 364, 365; 442/60, 189, 191, 442/192, 197, 286, 289, 301, 302, 303, 308, 442/309, 310, 334, 335, 341, 394, 397, 415, 442/65, 82, 181, 183, 327, 401, 414
See application file for complete search history.

(56) References Cited

U.S. PATENT DOCUMENTS

| | | | |
|---|---|---|---|
| 4,025,679 A | 5/1977 | Denny | |
| 4,324,574 A | 4/1982 | Fagan | |
| 4,877,683 A | 10/1989 | Bragaw et al. | |
| 4,943,473 A * | 7/1990 | Sahatjian et al. | ............. 442/289 |
| 4,983,434 A | 1/1991 | Sassa | |
| 4,988,540 A | 1/1991 | Bragaw et al. | |
| 5,141,800 A * | 8/1992 | Effenberger et al. | ......... 442/261 |
| 5,161,677 A | 11/1992 | Beecher | |
| 5,697,491 A | 12/1997 | Alex | |
| 5,814,405 A | 9/1998 | Branca et al. | |
| 6,479,143 B1 * | 11/2002 | Tamaru et al. | ................ 428/364 |
| 6,517,919 B1 | 2/2003 | Griffin | |
| 6,596,114 B2 * | 7/2003 | Tippett | .......................... 156/229 |
| 6,770,577 B2 | 8/2004 | Kelmartin et al. | |
| 7,087,136 B2 | 8/2006 | Tippett | |
| 7,261,937 B2 | 8/2007 | Lee et al. | |
| 7,523,626 B2 | 4/2009 | Enzien et al. | |
| 2004/0198127 A1 | 10/2004 | Yamamoto et al. | |
| 2005/0164581 A1 | 7/2005 | Mathiesen | |
| 2006/0046063 A1 * | 3/2006 | Tippett | ....................... 428/411.1 |
| 2014/0194023 A1 * | 7/2014 | Schwiegel et al. | ............ 442/189 |

FOREIGN PATENT DOCUMENTS

| | | |
|---|---|---|
| DE | 20 2004 020048 U1 | 3/2005 |
| EP | 2 174 783 A1 | 4/2010 |
| WO | 01/19610 A1 | 3/2001 |
| WO | 2007/019014 A2 | 2/2007 |
| WO | 2010/057321 A1 | 5/2010 |
| WO | 2012/033615 A1 | 3/2012 |

OTHER PUBLICATIONS

PCT/US2013/037490 ISR and Written Opinion established by the EPO, Jul. 31, 2013, 11 pages.

* cited by examiner

*Primary Examiner* — Arti Singh-Pandey
(74) *Attorney, Agent, or Firm* — Abelman, Frayne & Schwab

(57) ABSTRACT

A flexible non-porous laminate film structure is provided comprising a textile substrate having a fluorinated film laminated thereto, which is laminated at a temperature lower than the softening point of the predominant polymeric component of the fluoropolymer fiber. The resulting product is resistant to delamination.

33 Claims, 11 Drawing Sheets

FLEXIBLE LAMINATE STRUCTURE

RELATED APPLICATIONS

This application claims the benefit of U.S. Provisional Patent Application No. 61/635,721 filed Apr. 19, 2012 entitled "Flexible Laminate Structure," and U.S. Provisional Patent Application No. 61/635,521 entitled "Dispersion Spun Fluoropolymer Fiber Prepared from Non-Melt-Processible Polytetrafluroethylene and Perfluroalkoxy," the disclosures of which are hereby incorporated by reference in their entireties.

BACKGROUND OF THE INVENTION

1. Field of the Invention

This invention relates to flexible laminate structures, and in particular to flexible, fluid resistant laminate structures that can withstand a wide range of temperatures and pH values.

2. Description of Related Art

Flexible, fluid resistant materials that can withstand a wide range of temperatures and pHs are required for food processing belts and for expansion joints in factories and power plants. Ever increasingly harsher industrial environments require more robust materials than have heretofore been available.

Methods for continuously processing food products are known and typically have conveyors for transporting food products through a heating process. In some continuous heating conveyor ovens, radiant heat is provided by heated platens over which the belts travel. Such belt materials typically must resist continuous use temperatures of 500° F.-550° F., with infrequent excursions to 600° F.

Productivity is lost if the conveyer system uses belts that degrade quickly. Replacement of conveyer belts and calibration of conveyer systems are time consuming and costly. Downtime is extremely expensive in terms of lost manufacturing yield and may necessitate additional backup lines.

Conveyor belts used for processing food must meet certain FDA standards, including CFR 177.1550, which prohibit the contact of the prepared food with certain materials such as fiberglass. Unfortunately, the conventional conveyor belt used for processing such food is a composite of a brittle woven fiberglass substrate that is dip-coated and saturated in a protective fluoropolymer of PTFE. Scanning electron microscopy (SEM) images of such composite structures provide visual evidence of poor adhesion between the glass rod-like filaments and the PTFE polymer saturating the interior of the composite (FIGS. 1 ands 2). Cross-sectional analysis under SEM magnification show that the glass fibers readily separate from the PTFE and easily fracture.

The oft-called PTFE-coated fiberglass belts are routinely scrapped prematurely due to surface rupture or weak tear resistance, resulting in the exposure of fiberglass to food. Conveyor belts made from PTFE-coated fiberglass last only about a week or two in normal production. The root cause of failure in all instances is the presence of fiberglass.

The woven fiberglass substrate is composed of an industry standard, Style 1528 or 7628 fiberglass fabric with a tear strength (tongue) of about 13 lbs per inch, using ASTM D2261-07. However, the belts are customarily tensioned to at least 1 lbs per inch, which means that over a typical 45 inch wide belt, the total web tension would be 45 lbs. If some or all of that total load is concentrated at a point of tear, it greatly exceeds the tear strength of the fiberglass fabric and the substrate routinely fails.

Likewise for expansion joints, the material of choice has similarly been PTFE coated fiberglass. By definition, expansion joints require flexibility and oftentimes vibration resistance, so fiberglass offers a very limited lifetime because the fiberglass cuts itself to pieces internally. This is visually apparent in FIGS. 3 and 4, where (as a consequence of preparation of the sample for SEM analysis) the cross sectional view displays a jumble of brittle glass fibers, some fractured and the rest left unprotected from grating upon each other during flexure.

Certainly fluoropolymers have previously been applied to PTFE substrates (see, e.g., Bragaw U.S. Pat. No. 4,877,683, Denny U.S. Pat. No. 4,025,679, Fagan U.S. Pat. No. 4,324,574, Griffin U.S. Pat. No. 6,517,919, Kelmartin U.S. Pat. No. 6,770,577, Sassa U.S. Pat. No. 4,983,434), but these have created porous laminates involving porous films and adhesives. PTFE films have been laminated to other films (Tippett, U.S. Pat. No. 7,087,136, Bragaw U.S. Pat. No. 4,877,683), and PTFE film has been shown to be laminated to PTFE coated fiberglass (Tippett, U.S. Pat. No. 7,087,136, Matthiessen U.S. Pat. Pub. 2005/0164581) or suggestively laminated to PTFE woven substrates (Matthiessen U.S. Pat. Pub. 2005/0164581), but at temperatures so high above the melt point of PTFE as to make the material totally inflexible.

The concept of laminating PTFE film to a PTFE substrate to create a flexible, non-porous structure has not been previously revealed for good reason. The PTFE fiber-based substrate is generally not considered a good candidate for the presently envisioned laminate because of the seeming impossibility of laminating it to a fluorocarbon film and achieving a good result. Notwithstanding the lamination difficulties, it is also understood that without proper heat stabilization throughout each process, the fluoropolymer substrate would undergo 20-25% shrinkage when exposed to the 500° F.-550° F. operating temperatures of a food processing belt, resulting in uneven shrinkage within the laminate itself and tracking problems as the belt is driven and rotated.

Therefore, for uses including but not limited to food conveyor belts and expansion joints, a need exists for robust materials that can resist a wide range of temperatures and pH values, and that are tear resistant, fluid resistant, and highly flexible.

SUMMARY OF THE DISCLOSURE

In accordance with one or more embodiments, a flexible, non-porous laminate film structure is provided comprising a textile substrate having a fluorinated film laminated thereto, which is laminated at a temperature lower than the softening point of the predominant polymeric component of the fluoropolymer fiber. The resulting product is resistant to delamination.

In accordance with one or more embodiments, a laminate film structure is provided comprising one or more fluoropolymer films laminated to a flexible, tear-resistant fluoropolymer textile substrate. Material from the fluoropolymer film fills voids between at least some of the fibers of the substrate thereby forming a hybrid laminate material that is more tear resistant, impact resistant, and flexible as compared to conventional PTFE coated fiberglass composite materials.

In accordance with one or more embodiments, a laminate film structure is provided comprising a fluoropolymer film laminated to a surface of a textile substrate that includes fluoropolymer fibers.

In accordance with one or more embodiments, a laminate film structure is provided comprising fluoropolymer films laminated to opposing surfaces of a textile substrate that is comprised of fluoropolymer fibers.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the aspects and embodiments to be claimed. The accompanying drawings are included to provide illustration and a further understanding of the various aspects and embodiments, and are incorporated in and constitute a part of this specification. The drawings, together with the remainder of the specification, serve to explain principles of the described laminate structure and aspects and embodiments which are to be claimed.

BRIEF DESCRIPTION OF THE DRAWING

The foregoing summary, as well as the following detailed description of certain embodiments will be better understood when read in conjunction with the appended drawings. For the purpose of illustrating the invention, there are shown in the drawings certain embodiments, although it should be understood that the invention is not limited to the precise arrangements and instrumentalities shown.

FIGS. 5 and 6 are scanning electron microscope photographs of a flexible laminate film structure described herein, in which FIG. 6 shows a cross-section at a slight perspective angle;

DETAILED DESCRIPTION

The flexible, non-porous laminate film structure described herein is useful in the processing of commercial products over a wide range of viscosities, temperatures, and pHs. For instance, the laminate film structure is suitable for uses including but not limited to food preparation conveyor belts, expansion joint materials, flexible ducting and for the transmission of gaseous fluids.

The herein described laminate film structure is useful as a replacement for conventional PTFE-coated fiberglass composites. The herein laminate structure is, in certain embodiments, formed of a woven substrate of a PTFE fluorocarbon fiber or PTFE-PFA hybrid fluorocarbon fiber that has been heat stabilized at high temperature which is laminated to a pre-formed PFA film at a temperature between the melt point of PFA (582° F., 305° C.), and that of PTFE (627° F., 330° C.). The roughly 45° F. (25° C.) difference allows for melting of the PFA in the film and the yarn to occur at a temperature safely lower than that of the predominant polymer in the yarn, PTFE. Significantly, the unaffected PTFE retains its strength and structural flexibility, as does the overall textile substrate. The melted and re-solidified PFA component after cooling does not adversely impact the substrate. The softening point of the PTFE in the substrate is cautiously avoided, lest the substrate stiffen upon cooling and lose the desired properties of the finished laminate.

The term "laminate" as used herein means layers of materials bonded together, in this case a film to a textile substrate, in contrast to a "composite" formed by saturation coating of a polymeric fluidic paste within and throughout a substrate, such as in dip-coating.

The term "film" as used herein means a relatively thin polymeric layer, which can be variously described as a non-cellular membrane or a non-metallic foil.

The terms "fluoropolymer" and "fluorocarbon," which may be used interchangeably, refer to a fluorocarbon-based polymer with multiple strong carbon-fluorine bonds.

The term "textile" as used herein means a woven, knit, or non-woven structure composed of fibers.

The term "non-porous" as used herein means that the measured flow rate of air through the laminate is zero cubic feet per minute per square foot of material area under a pressure drop of 0.5" $H_2O$ using Test Method ASTM D737.

The term "flexible" as used herein in relation to describing the laminate structure means that is it capable of being draped or rolled over a relatively narrow radius cylindrical rod and returned to a straight configuration repeatedly without significant change in the performance of the laminate structure.

The term "SEM," an acronym for scanning electron microscope, as used herein means photo micrographs taken under 80× or greater magnification.

Figure 11:
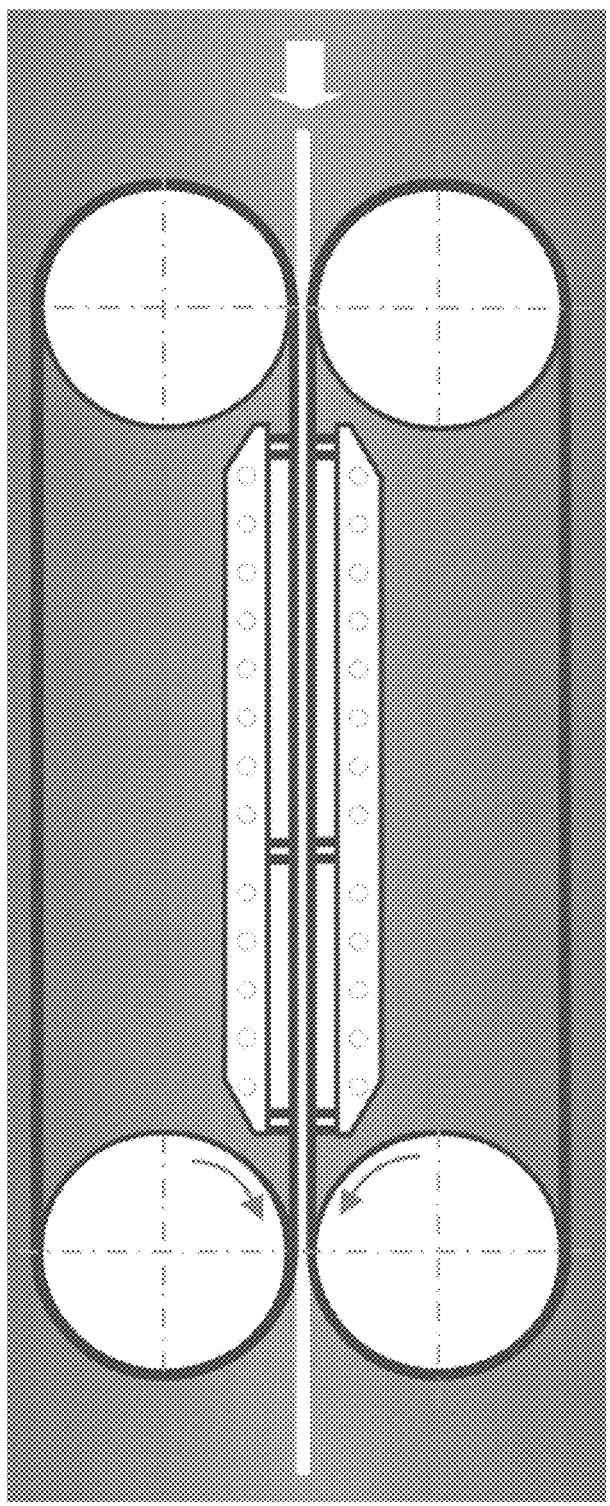
FIG. 11 is a schematic illustration of a double belt press laminator.

In one embodiment of a process to manufacture the herein described flexible non-porous laminate structure, a textile is provided as a substrate and a fluorinated film is laminated to the textile. The counter-rotating steel belts of a double belt press laminator pull the textile and the fluorinated film from an off-wind stand between heated pressure plates where lamination occurs, optionally through standard cooling plates, and then onto a re-wind stand. A general diagram of a conventional double belt press laminator is shown in FIG. 11.

The fluorinated film is a film formed of resins such as perfluoroalkoxy copolymer (e.g., commercially available from E. I. DuPont de Nemours under the trade name Teflon® PFA resin) or chemically modified polytetrafluoroethylene (PTFE) polymer (e.g., commercially available from E. I. DuPont de Nemours under the trade name Teflon® NXT resin).

Figure 5:
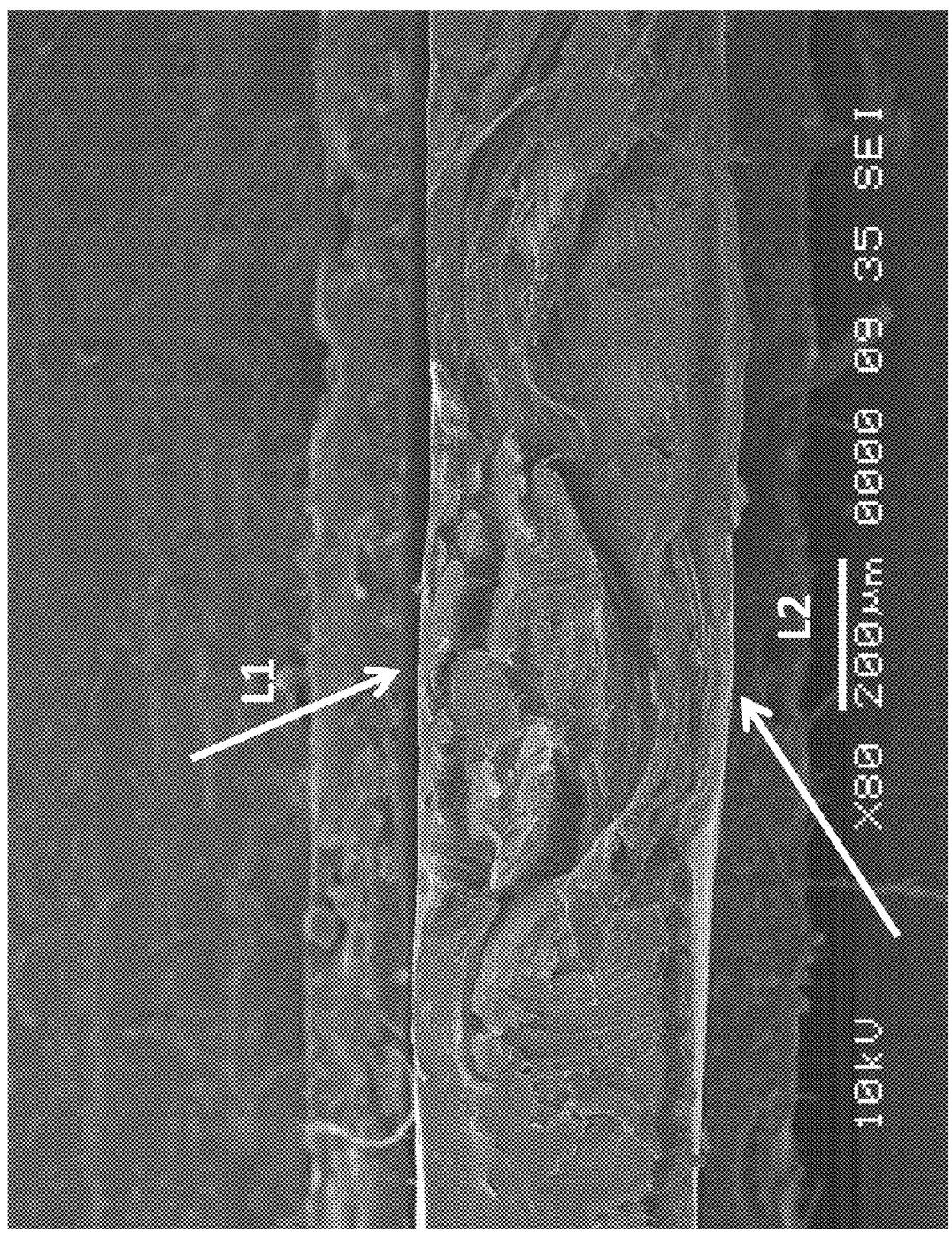
Figure 6:
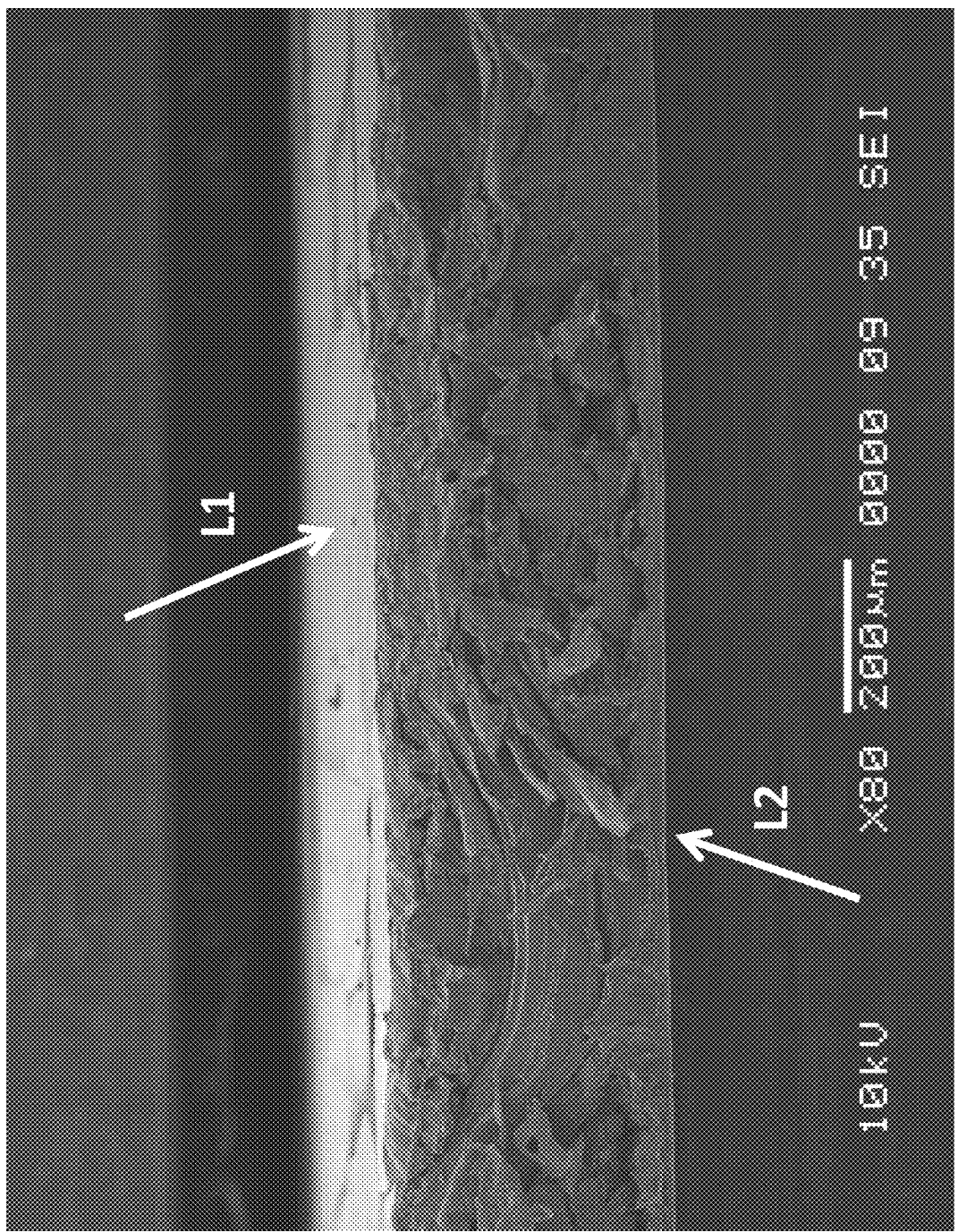

Cross-sectional views under SEM magnification of the laminate in FIGS. 5 and 6 show that
   a. the film has flowed into the interstitial voids of the woven structure as if it had been coated;
   b. the film has encapsulated the surface and near-subsurface fibers of the substrate; and
   c. the film has formed a smooth, unbroken surface.

Figure 1:
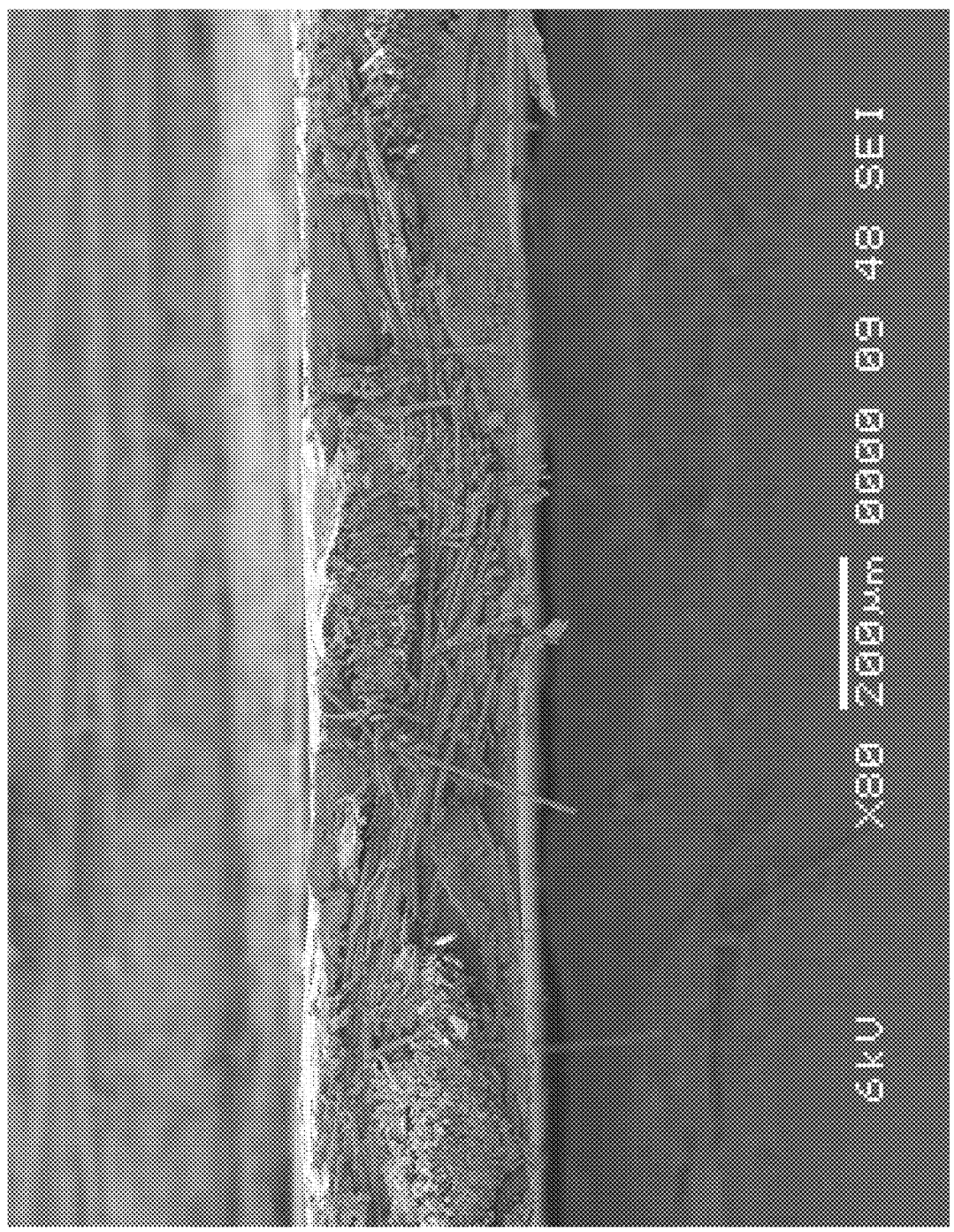
FIGS. 1-4 are scanning electron microscope photographs of conventional composite structures formed of a woven fiberglass substrate that is dip-coated and saturated in a protective fluoropolymer of PTFE.
Figure 2:
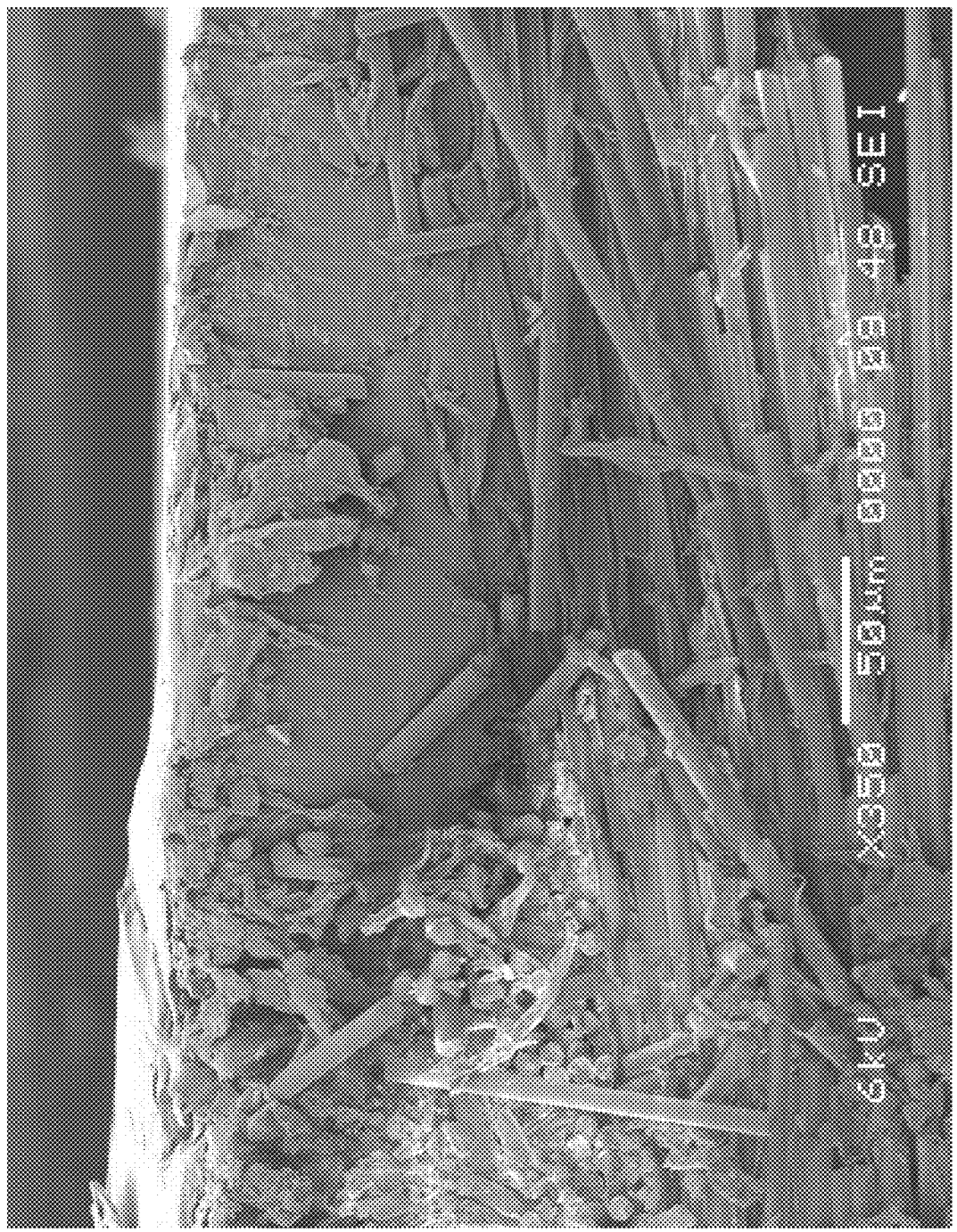
Figure 3:
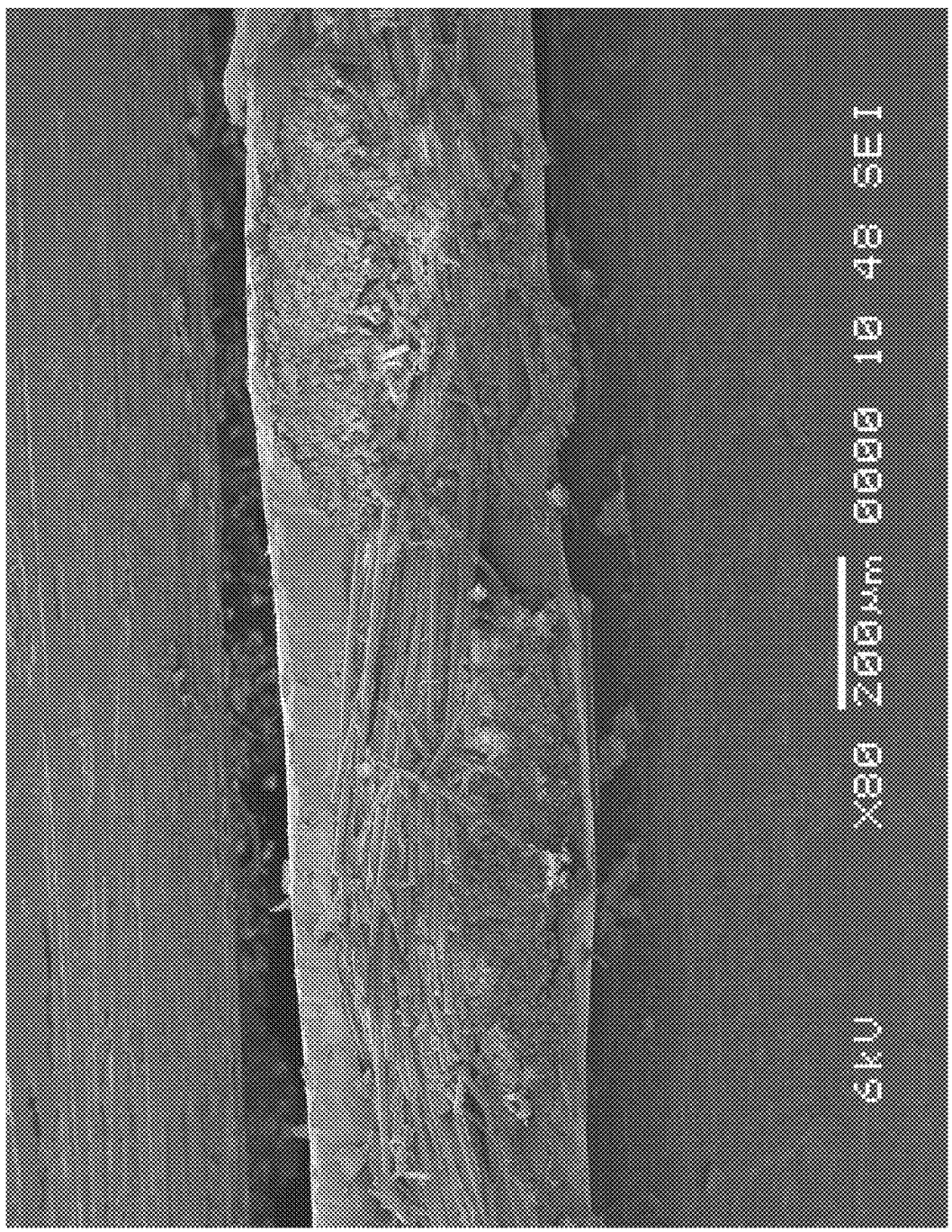
Figure 4:
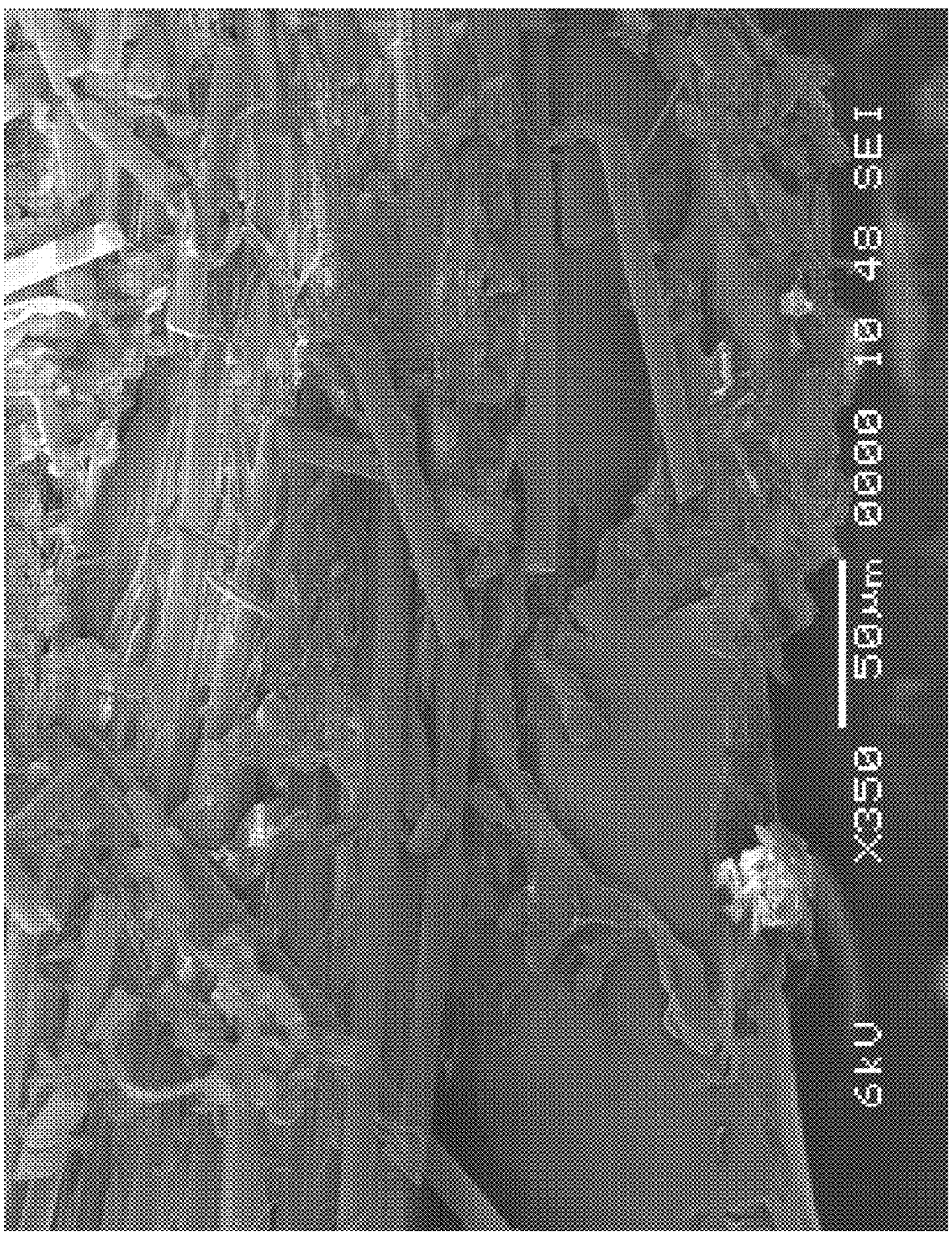

In addition, the fluoropolymer fibers have partially softened and merged into a flexible mass between the film layers (L1 and L2). As is apparent, the film layers are minimally discernible, for instance when viewed using scanning electron microscopy. Although the softening point of the predominant component in the yarn, PTFE, has not been reached, it appears that it too has softened, when in fact it has not. Examination of the fibers in the substrate shows a fiber that is more gelatinous and amorphous in shape than the fiberglass fiber evident in FIGS. 1 and 2 or of a conventional PTFE fiber evident in FIGS. 8-10.

The resulting laminate in embodiments which are 100% fluoropolymer provides an additional benefit of being 100% compatible with CFR 177.1550, a useful benefit if for any reason the film should rupture and the woven fabric should become exposed to food. In such a circumstance, the belt remains suitable for use and need not be immediately taken out of use or scrapped, as is the case with the conventional PTFE coated fiberglass composite material based food conveyor belts.

The hybrid laminate material is more tear resistant, impact resistant, and flexible than the conventional PTFE coated fiberglass composite material. In certain embodiments of the flexible laminate formed according to the present description, the PFA/PTFE laminated material can last up to, and in certain embodiments more than, 10 times longer in use than the conventional material used, e.g., for food processing belts and for flexible seals and joints.

Suitable textile substrates include woven, knit, or non-woven structure comprising fluoropolymer fibers, PTFE fluorocarbon fibers or combinations thereof. A suitable fiber is described in related U.S. Provisional Patent Application No. 61/635,521 entitled "Dispersion Spun Fluoropolymer Fiber Prepared from Non-Melt-Processible Polytetrafluroethylene and Perfluroalkoxy," the disclosure of which is hereby incorporated by reference. Dispersion spun fluoroploymer fibers include a blend of PTFE particles and PFA particles. The fluoroploymer fiber is prepared by forming an aqueous dispersion of PFA particles and PTFE particles, mixing the dispersion with an aqueous matrix polymer solution containing a matrix polymer, extruding the mixture into a coagulation bath and forming an intermediate fiber structure. The intermediate fiber structure is sintered to decompose the matrix polymer and coalesce the PTFE particles and the PFA particles into a blended fiber. The matrix spinning process of PTFE allows for the inclusion of an appreciable concentration of PFA in to a fiber structure that has sufficient tensile properties for normal textile processing such as knitting and weaving. The inclusion of PFA into a matrix spun PTFE fiber results in a true biocomponent fiber with typical thermal capabilities (maximum continuous use temperature) of PTFE. Further, the inclusion of PFA into the fiber matrix provides a lower melt component to the fiber. This lower melt component when in a fabric structure provides a system to which a PFA film can be laminated at lower temperature and pressures compared to 100% PTFE. In certain embodiments, the PTFE particles are non-melt processible, which means that no melt flow is detected when tested by the standard melt viscosity determining procedure for melt-processible polymers, e.g., ASTM D-1238-00 or modifications thereof.

In one embodiment, a hybrid, multifilament yarn is used to form the textile substrate that is produced by Toray Fluorofibers USA in a ratio of 3:1 by weight of PTFE and PFA dispersions, said hybrid yarn offering two softening points, one at about 305° C. (582° F.) for the PFA and a higher one at about 330° C. (627° F.) for the predominant PTFE element. The fiber has the following nominal properties: round cross-section, 1200 denier, 6.7 denier per filament, 1.2 g/d break tenacity, 50% elongation at the break, and 11.5% shrinkage at 300° C. for 30 minutes, based on standard industry testing methods for synthetic yarn. Test fiber was woven into a 1∴2 basket weave with a balanced count of 59x59. It was heatset at 600° F. (315° C.) in a fully tensioned state on a tenter frame at the rate of 20 yards per minute, using standard tentering equipment and procedures, to produce a dimensionally stabilized fabric.

The dimensionally stabilized fabric was then laminated to a standard 1 or 2 mil PFA extruded film (produced commonly by E. I. DuPont de Nemours or Saint Gobain), using either isobaric or isochoric double belt press technology in common use, at temperatures between 590° F. (310° C.) and 620° F. (327° C.), preferably 600° F. (315° C.), and at pressures greater than about 20 bar (290 psi), and in certain embodiments between 30 and 50 bar (435-725 psi), at suitable speeds to provide the requisite dwell time, e.g., approximately 0.5 meters per minute to 6.5 meters per minute. In one embodiment a dwell time of about 10 seconds is achieved at a feed rate of approximately 4 m/min.

Figure 8:
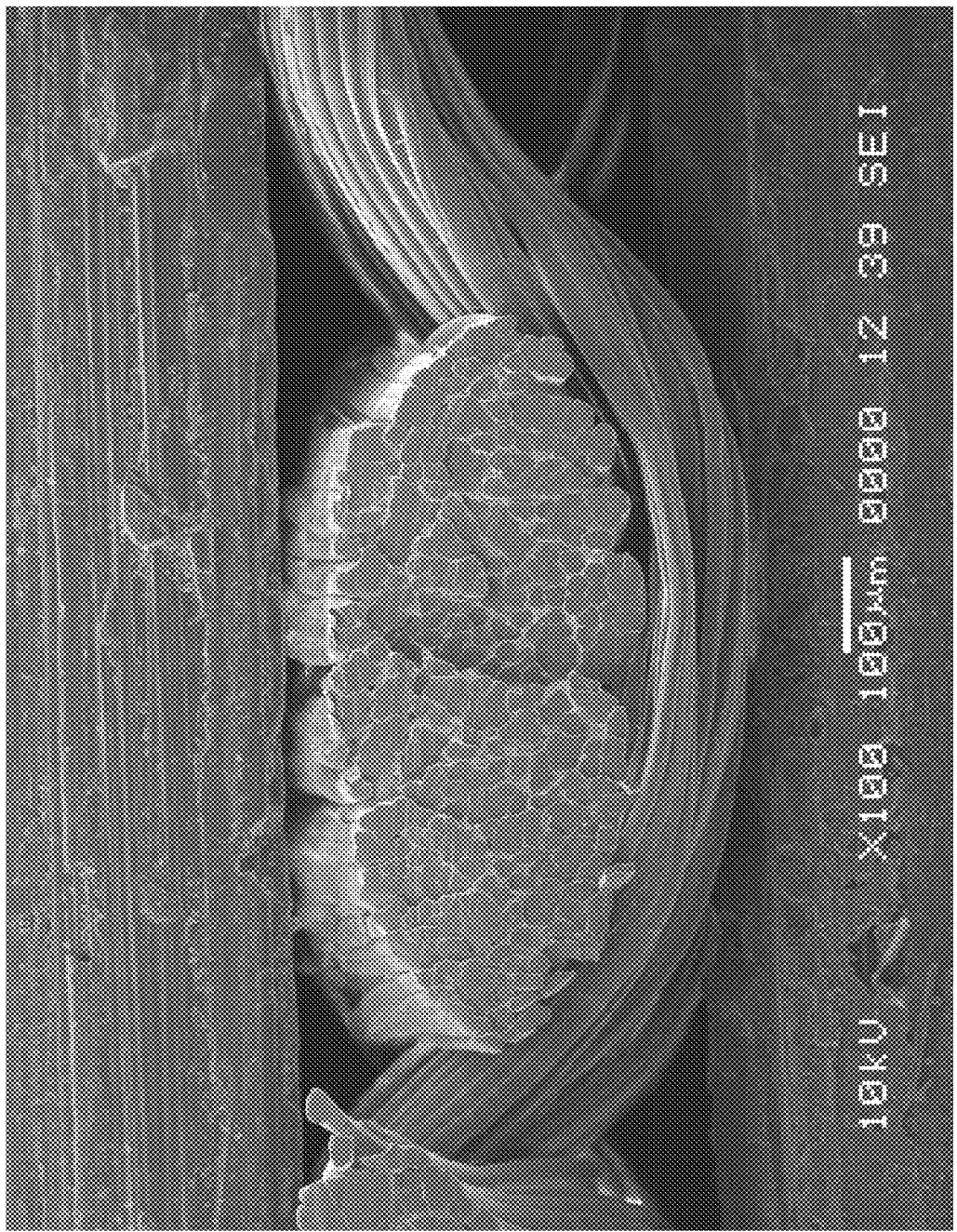
FIGS. 8, 9 and 10 are scanning electron microscope photographs of conventionally laminated structures prone to delamination.
Figure 9:
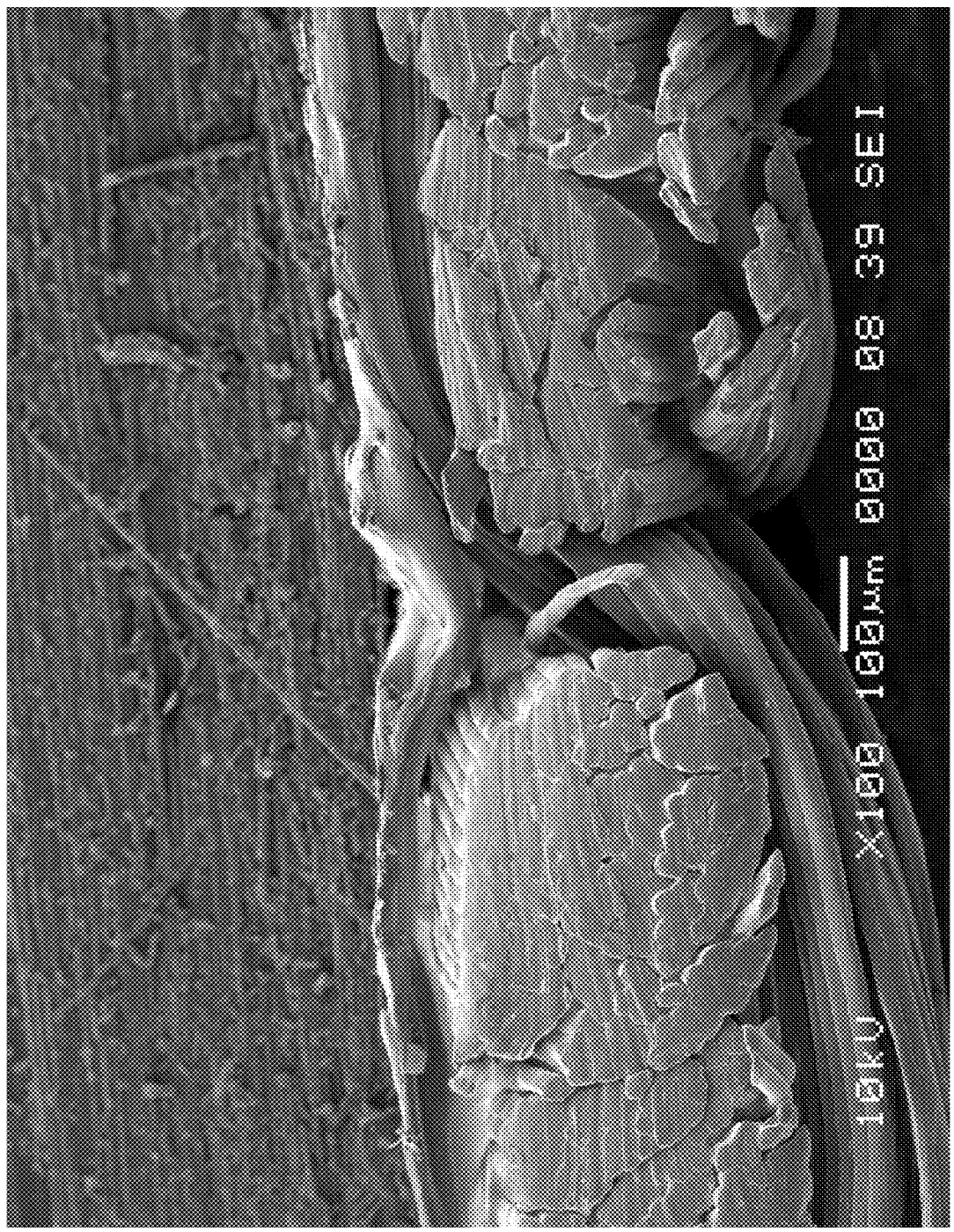
Figure 10:

It was unexpectedly found that an appropriate combination of temperature and pressure results in the laminate structure having the desired properties of high peel strength, flexibility, impermeability, and tear resistance. Under the appropriate combination of temperature and pressure, the film "wets out" and becomes intimately bonded to the substrate, whereby the term "wetting out" describes a visual phenomenon in which an opaque or translucent fabric or film becomes transparent during processing, e.g., when a woven fiberglass fabric that appears white when dry becomes transparent when immersed in epoxy resin and using common industry terminology it "wets out" and appears to dissolve into the underlying resinous material. PFA film that has been laminated at too low of a pressure, or at too short of a dwell time such as in a conventional calendaring operation, does not wet out, bonds weakly to the substrate, and is easily peeled off by hand. Such a weak bond is shown in FIGS. 8-10, where the film has not been intimately bonded to the fiber of the substrate, and appears to float above the surface of the substrate.

Figure 7:
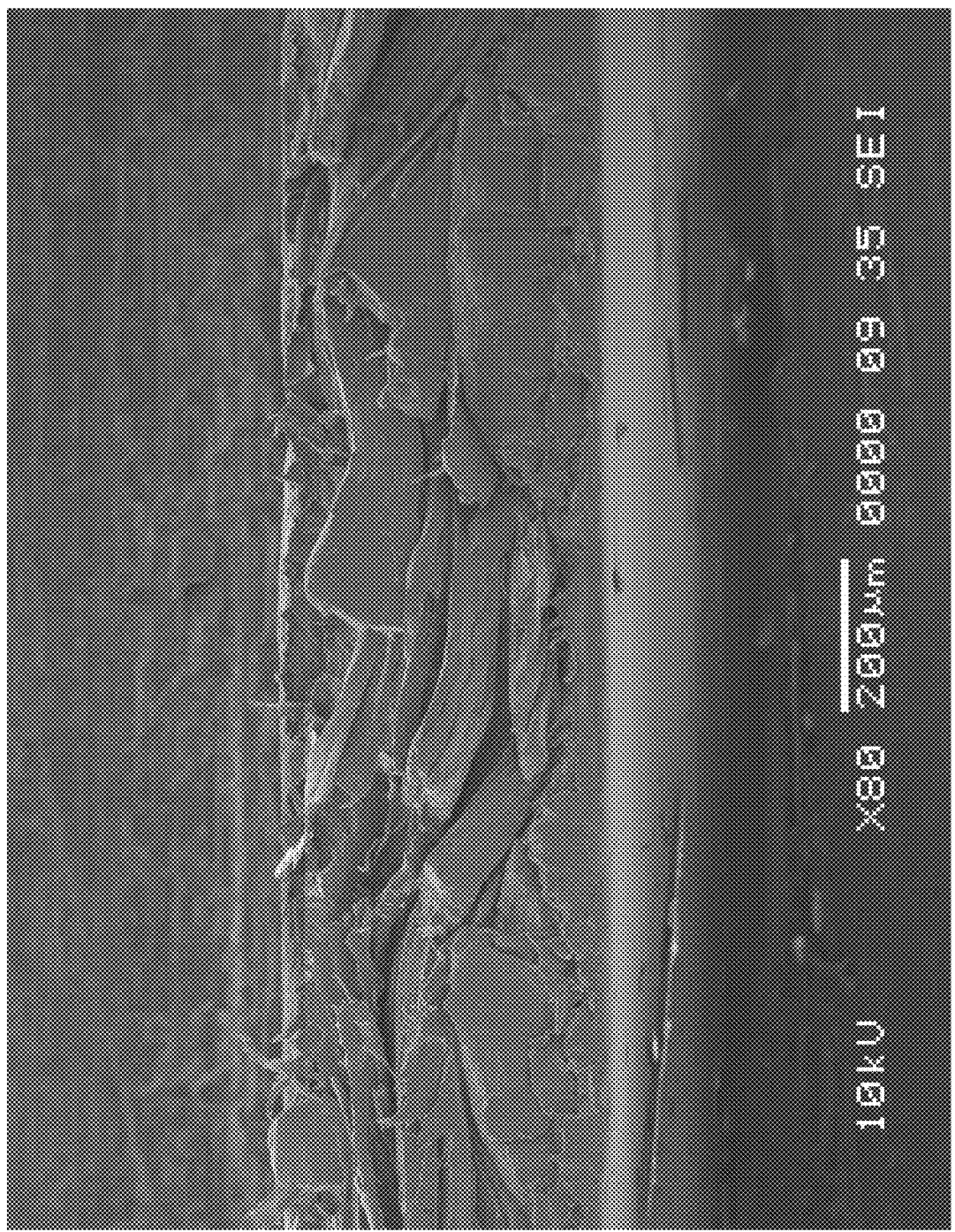
FIG. 7 is a scanning electron microscope photograph of PTFE fibers modified in a laminate film structure described herein.

As indicated in FIGS. 5 and 6, PFA film that has been laminated at the appropriate temperature, pressure and dwell time is intimately suffused into the surface of the substrate fiber. It can be seen in FIG. 7 that the original cross-section of each fluoropolymer fiber in the woven substrate is no longer round, but has deformed to fill the voids around it. With the naked eye during lamination, the film can be seen to have wetted out on the surface. The bond between surface film and subsurface fibers is so complete that any attempt to peel one of the film layers from the substrate is tantamount to rupturing the substrate itself. This is in stark contrast to laminated fluoropolymers formed by conventional calendaring, such as shown in FIGS. 8-10, whereby the original cross-section of each fiber in the woven substrate remains round. It should be noted that razor cutting for purposed of SEM cross-sectional photograph may distort the end view of the bundle of fibers. For instance, in FIG. 9, the stray fiber near the center of the photograph clearly has a round cross-section.

Furthermore, the gauge of the laminate structure formed herein is significantly less than that of the total of the individual thickness gauges of its components—film and textile. For instance, in FIGS. 5-7 the laminate shown is composed of 24 mil (0.024 in) textile sandwiched between about 2 mil (0.002 in) films, for a total pre-lamination gauge of 0.028 inches. Lamination reduced the three layers to an average gauge of 0.0177 inches, a reduction of approximately 40%.

Note that in certain embodiments, the gauge of the textile component can be reduced, e.g, to as low as 5 mil using a 200 denier textile fiber Likewise, a 400 denier textile fiber offers a textile component having a gauge as low as 8 mil. In these embodiments, the film component(s) can be 1 mil for a potential laminate structure gauge of 4 mil or 6 mil, using 200 denier or 400 denier fibers, respectively. The thinner gauge laminate structures are effective for applications requiring greater flexibility and/or higher rates of heat transfer.

Advantageously, the herein laminate structure is effective for its intended use as a food conveyor belt, expansion joint, flexible ducting, and for forming passageways for transmission of gaseous fluids. Notably certain embodiments of the herein laminate structure require:

a. no surface etching of the film; b. no intermediary dispersions or glues, fibrils or nodes, or similar interconnecting paths on or in the surface of the fluoropolymer film to create strong adhesion between substrate and film; c. no fillers; and d. no special cooling features or process steps other than ambient to fixate the lamination for dimensional stability.

The method and structure of the present invention have been described above and in the attached drawings; however, modifications will be apparent to those of ordinary skill in the art and the scope of protection for the invention is to be defined by the claims that follow.

The invention claimed is:

1. A flexible, non-porous laminate film structure comprising a textile substrate and at least one fluoropolymer film layer,
wherein the textile substrate is formed of fluoroploymer fibers comprising a blend of poytetrafluoroethylene material and polyfluororalkoxy material, and
wherein the fluoropolymer film layer is intimately bonded to the textile substrate and material from the fluoropolymer film layer fills voids between at least some of the fibers of the substrate.

2. The laminate film structure as in claim 1 wherein the film wets out during the lamination process.

3. The laminate film structure as in claim 1 wherein material from the fluoropolymer film layer within voids between fibers of the substrate is visible under SEM magnification.

4. The laminate film structure as in claim 1 wherein the fibers of the textile substrate initially have a round cross-section, and wherein the fibers of the textile substrate are transfused into an amorphous mass and the round cross-sections of the fibers are morphed into geometries suitable for filling interstitial voids in the textile structure, as is visible under SEM magnification.

5. The laminate film structure as in claim 1 that is prepared without surface etching of the film.

6. The laminate film structure as in claim 1 that is prepared without intermediary dispersions or glues, fibrils or nodes, or similar interconnecting paths on or in the surface of the fluoropolymer film conventionally used to create strong adhesion between substrate and film.

7. The laminate film structure as in claim 1 that is prepared in the absence of fillers.

8. The laminate film structure as in claim 1 that is prepared in the absence of cooling processing steps other than ambient to fixate the lamination for dimensional stability.

9. The laminate film structure of claim 1 that is laminated at a temperature lower than the softening point of the predominant polymeric component of the fluoropolymer fiber.

10. The laminate film structure of claim 1 that is laminated between 310° C. and 325° C., under steady pressure of at least 20 bars at a speed of 0.5 m/min to 6.5 m/min.

11. The laminate film structure of claim 1 that is laminated between 310° C. and 325° C., under steady pressure of at 30-50 bars for approximately 10 seconds.

12. The laminate film structure of claim 1, wherein the textile substrate comprises fluoropolymer fibers that are at least 75% by weight polytetrafluoroethylene and 25% by weight polyfluoroalkoxy.

13. The laminate film structure of claim 12, wherein the ratio of polytetrafluoroethylene to polyfluoroalkoxy is 3 to 1.

14. The laminate film structure of claim 12, wherein the film is wholly or predominately polyfluoroalkoxy or polytetrafluoroethylene.

15. The laminate film structure of claim 1 in which the film is laminated on one or both sides of the substrate.

16. The laminate film structure of claim 1 wherein the textile substrate is a woven or knit fabric.

17. A conveyor belt composed of the laminate film structure of claim 1.

18. A flexible duct composed of the laminate film structure of claim 1.

19. An expansion joint composed of the laminate film structure of claim 1.

20. The laminate film structure of claim 1 wherein the fluoroploymer fibers provide two softening points.

21. The laminate film structure of claim 20 wherein the two softening points include one at about 305° C. for the polyfluoroalkoxy material and another at about 330° C. for the polytetrafluoroethylene material.

22. A method of manufacturing a flexible non-porous film comprising:
providing a fluoropolymer film layer of a first material and providing a textile substrate formed of fluoropolymer fibers of a second material that is a blend of poytetrafluoroethylene and polyfluoroalkoxy, wherein the first material has a lower melting point than the second material; and
laminating the fluoropolymer film layer and the textile substrate at a temperature that is between the melting points of the first material and the second material to produce a flexible non-porous film.

23. The method as in claim 22 which is conducted without surface etching.

24. The method as in claim 22 which is conducted without intermediary dispersions or glues, fibrils or nodes, or similar interconnecting paths on or in the surface of the fluoropolymer film conventionally used to create strong adhesion between substrate and film.

25. The method as in claim 22 which is conducted in the absence of fillers.

26. The method as in claim 22 which is conducted in the absence of cooling processing steps other than ambient cooling to fixate the lamination for dimensional stability.

27. The method of claim 22 wherein the fluoropolymer fibers comprise polytetrafluoroethylene-polyfluoroalkoxy hybrid fluorocarbon fibers.

28. The method of claim 22 wherein the fluoropolymer film layer is polyfluoroalkoxy.

29. The method of claim 22 wherein the fluoropolymer film layer is chemically modified polytetrafluoroethylene.

30. The method of claim 22 wherein the fluoropolymer film layer wets out during processing.

31. The method of claim 22 wherein lamination occurs between 310° C. and 325° C., under steady pressure of at least 20 bars at a speed of 0.5 m/min to 6.5 m/min.

32. The method of claim 22 wherein lamination occurs between 310° C. and 325° C., under steady pressure of at 30-50 bars for approximately 10 seconds.

33. The method of claim 22 wherein laminating comprises
pulling the textile substrate and the fluoropolymer film layer by counter-rotating steel belts of a double belt press laminator, and
conveying the textile substrate and the fluoropolymer film layer between heated pressure plates.

* * * * *